United States Patent
Sun et al.

(10) Patent No.: US 11,615,003 B2
(45) Date of Patent: *Mar. 28, 2023

(54) OPTIMIZED NEURAL NETWORK DATA ORGANIZATION

(71) Applicant: Western Digital Technologies, Inc., San Jose, CA (US)

(72) Inventors: Chao Sun, San Jose, CA (US); Yan Li, Milpitas, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,111

(22) Filed: Aug. 2, 2021

(65) Prior Publication Data

US 2021/0365333 A1    Nov. 25, 2021

Related U.S. Application Data

(63) Continuation of application No. 16/413,492, filed on May 15, 2019, now Pat. No. 11,080,152.

(51) Int. Cl.
*G06F 11/14* (2006.01)
*G06N 3/08* (2006.01)

(52) U.S. Cl.
CPC ........... *G06F 11/1476* (2013.01); *G06N 3/08* (2013.01); *G06F 2201/805* (2013.01)

(58) Field of Classification Search
None
See application file for complete search history.

(56) References Cited

U.S. PATENT DOCUMENTS

| | | | |
|---|---|---|---|
| 5,963,929 A | 10/1999 | Lo | |
| 8,819,335 B1 | 8/2014 | Salessi et al. | |
| 10,116,336 B2 | 10/2018 | Hu et al. | |
| 11,080,152 B2* | 8/2021 | Sun .................... | G06N 3/0454 |

(Continued)

OTHER PUBLICATIONS

International Search Report and Written Opinion, PCT Application No. PCT/US2019/067668, dated Mar. 26, 2020.

(Continued)

*Primary Examiner* — Guerrier Merant
(74) *Attorney, Agent, or Firm* — Ravi Mohan; Rutan & Tucker, LLP

(57) ABSTRACT

In some implementations, the present disclosure relates to a method. The method includes obtaining a set of weights for a neural network comprising a plurality of nodes and a plurality of connections between the plurality of nodes. The method also includes identifying a first subset of weights and a second subset of weights based on the set of weights. The first subset of weights comprises weights that used by the neural network. The second subset of weights comprises weights that are prunable. The method further includes storing the first subset of weights in a first portion of a memory. A first error correction code is used for the first portion of the memory. The method further includes storing the second subset of weights in a second portion of the memory. A second error correction code is used for the second portion of the memory. The second error correction code is weaker than the first error correction code.

18 Claims, 10 Drawing Sheets

(56) References Cited

U.S. PATENT DOCUMENTS

| | | |
|---|---|---|
| 2015/0212889 A1 | 7/2015 | Amarendran et al. |
| 2017/0323201 A1 | 11/2017 | Sutskever et al. |
| 2017/0337466 A1 | 11/2017 | Bayat et al. |
| 2017/0371585 A1 | 12/2017 | Lazo et al. |
| 2018/0143762 A1 | 5/2018 | Kim et al. |
| 2018/0189635 A1 | 7/2018 | Olarig et al. |
| 2019/0073259 A1 | 3/2019 | Qin et al. |
| 2020/0042871 A1 | 2/2020 | Francini et al. |
| 2020/0057561 A1 | 2/2020 | Lai et al. |
| 2020/0117539 A1 | 4/2020 | Sun et al. |
| 2020/0151562 A1 | 5/2020 | Pietquin et al. |

OTHER PUBLICATIONS

Chi, P. et al., "PRIMES: A Novel Processing-inmemory Architecture for Neural Network Computation in ReRAM-based Main Memory", ISCA '16: Proceedings of the 43rd International Symposium on Computer Architecture, pp. 27-89, Jun. 2016.

\* cited by examiner

OPTIMIZED NEURAL NETWORK DATA ORGANIZATION

PRIORITY CLAIM

This application claims the benefit of and priority to U.S. patent application Ser. No. 16/413,492, filed May 15, 2019, now issued U.S. Pat. No. 11,080,152, which is incorporated in its entirety herein.

BACKGROUND

Field of the Disclosure

This disclosure relates to data storage or memory devices. More particularly, the disclosure relates to accessing artificial intelligence related data, such as neural network data, in data storage or memory devices.

Description of the Related Art

Data storage or memory devices may be used to store data used by computing devices. Data associated or related to neural network (or other artificial intelligence systems) may be stored on the data storage or memory devices. For examples, input files, weights, and/or results (e.g., output) generated by neural networks may be stored on data storage or memory devices.

SUMMARY

In some implementations, the present disclosure relates to a method. The method includes selectively storing a first subset of weights for a neural network in a first portion of a memory, the neural network comprising a plurality of nodes and a plurality of connections between the plurality of nodes. The first subset of weights comprises weights used by the neural network. A first error correction code is used for the first portion of the memory. The method also includes selectively storing a second subset of weights for the neural network in a second portion of the memory. The second subset of weights comprises weights that are prunable. A second error correction code is used for the second portion of the memory. The second error correction code is weaker than the first error correction code.

In some implementations, the present disclosure relates to an apparatus. The apparatus includes a memory configured to store data. The apparatus also includes a controller coupled to the memory. The controller is configured to selectively store a first subset of weights for a neural network in a first portion of the memory, the neural network comprising a plurality of nodes and a plurality of connections between the plurality of nodes. The first subset of weights comprises weights used by the neural network. A first error correction code is used for the first portion of the memory. The controller is also configured to selectively store a second subset of weights for the neural network in a second portion of the memory. The second subset of weights comprises weights that are prunable. A second error correction code is used for the second portion of the memory. The second error correction code is weaker than the first error correction code.

In some implementations, a non-transitory machine-readable medium having executable instructions to cause one or more processing devices to perform operations. The operations include selectively storing a first subset of weights for a neural network in a first portion of a memory, the neural network comprising a plurality of nodes and a plurality of connections between the plurality of nodes. The first subset of weights comprises weights used by the neural network. A first error correction code is used for the first portion of the memory. The operations also include selectively storing a second subset of weights for the neural network in a second portion of the memory. The second subset of weights comprises weights that are prunable. A second error correction code is used for the second portion of the memory. The second error correction code is weaker than the first error correction code.

The examples, implementations, and/or embodiments disclosed herein may refer to memory. Memory may include and/or refer to both non-volatile memory (e.g., flash memory, SCM, etc.) and volatile memory (e.g., random-access memory (RAM)). For example, there any number of different types and/or any combination of volatile memory and non-volatile memory may be used in the data storage or memory system. Although the present disclosure may refer to non-volatile memory in various examples or embodiments, the non-volatile memory is merely an example of one type of memory that may be used. Other embodiments may applicable to volatile memory.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following disclosure, reference is made to examples, implementations, and/or embodiments of the disclosure. However, it should be understood that the disclosure is not limited to specific described examples, implementations, and/or embodiments. Any combination of the features, functions, operations, components, modules, etc., disclosed herein, whether related to different embodiments or not, may be used to implement and practice the disclosure. Furthermore, although embodiments of the disclosure may provide advantages and/or benefits over other possible solutions, whether or not a particular advantage and/or benefit is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

The headings provided herein are for convenience only and do not necessarily affect the scope or meaning of the claimed invention. Disclosed herein are example implementations, configurations, and/or embodiments relating to accessing artificial intelligence related data stored in data storage or memory devices.

Data storage or memory devices, such as solid state drives (SSDs), hard disk drives (HDDs), hybrid drives (e.g., storage drives/devices that include both magnetic media/medium and flash memory), etc., typically include one or more controllers coupled with one or more non-volatile memory (NVM) arrays. The data storage or memory devices may store various different types of data. For example, the data storage or memory devices may store data that may be analyzed and/or processed by a neural network or other machine learning systems.

A data storage or memory device may store all of the data in the data storage or memory device in a conventional or standard manner. For example, the data storage or memory device may use the same ECC to store weight data for a neural network, input data, result data and metadata for the files stored on the data storage or memory device. Or the data storage or memory device may include or use one type of memory to store all of the data in the data storage or memory device. However, different types of data may be more important than other types of data and thus should be protected differently. In addition, different types of data may be modified more frequently and/or accessed more often. Thus, it may be useful to decrease the amount of time to access the frequently accessed or modified data.

Figure 1:
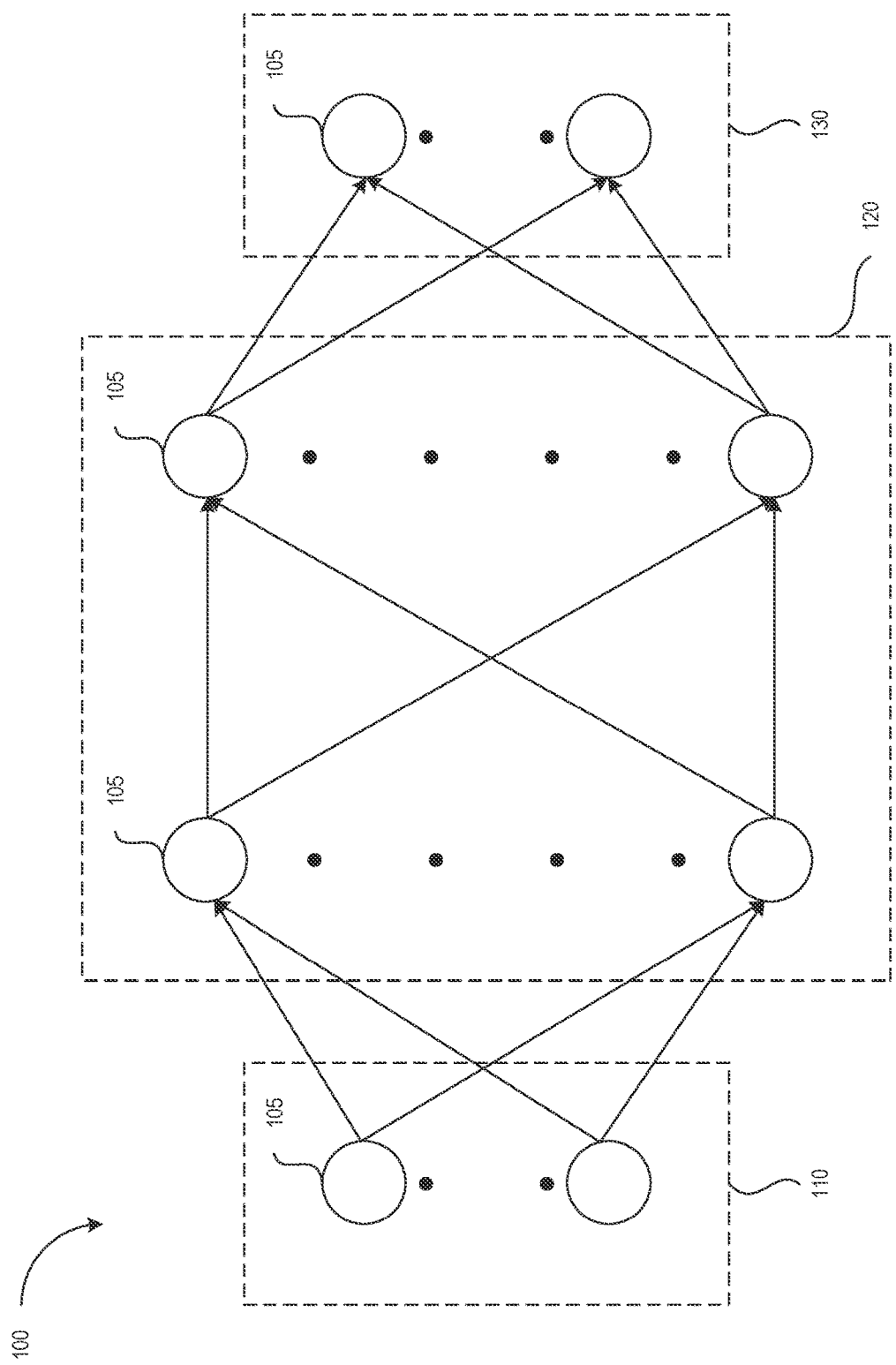
FIG. 1 is a diagram illustrating an example neural network, in accordance with one or more embodiments of the present disclosure.

FIG. 1 is a diagram illustrating an example neural network 100, in accordance with one or more embodiments of the present disclosure. The neural network 100 may be used to model relationships between (e.g., complex) inputs and outputs or to find patterns in data, where the dependency between the inputs and the outputs may not be easily ascertained. The neural network 100 may also be a computing model that may be used to determine a feature in input data through various computations. For example, the neural network 100 may determine a feature (e.g., a number, shape, pattern, etc.) in input data (e.g., audio data, image data, video data, etc.) according to a structure that defines a sequence of computations to be performed.

The neural network 100 may be a CNN. A CNN may be a feed forward neural network. A feed forward neural network may be a type of neural network where the connections between the nodes do not form a cycle. For example, the signals, messages, data, information etc., flow forward from the input layer 110 (e.g., from the input nodes), through the hidden layer 120, to the output layer 130 (e.g., to the output nodes) of the neural network 100 from left to right. The signals, messages, data, information etc., may not go backwards through the neural network (e.g., may not go from right to left). A CNN may be used for image analysis. The weights of the connections may take the form of a convolutional filter that may be applied to different pixels of an image. Although the present disclosure may refer to image analysis for CNNs, in other embodiments, the CNN may be used for other types of data and inputs.

The neural network 100 includes an input layer 110, a hidden layer 120, and an output layer 130. Each of the input layer 110, the hidden layer 120, and the output layer 130 includes one or more nodes 105. Each of the input layer 110, the hidden layer 120, and the output layer 130 may have a different number of nodes 105. The neural network 100 may be a deep neural network or a deep CNN. A neural network may be deep if the hidden layer 120 includes multiple levels (e.g., multiple columns of nodes 105, multiple sub-layers of nodes 105). As illustrated in FIG. 1, the neural network 100 includes two levels (or sub-layers) of nodes 105 (e.g., two columns of nodes 105).

Each of the nodes 105 in a layer is connected to either a node 105 in the next level (e.g., next sub-layer) or a node 105 in another layer, as represented by the arrows/lines between the nodes 105. For example, the nodes 105 in the input layer are each coupled to at least one node 105 in the hidden layer 120. Neural network 100 may be a fully connected neural network. For example, each node 105 in each layer or level is connector to each node in the subsequent layer or level where there is a subsequent layer or level (e.g., nodes 105 in the output layer 130 are not connected to other nodes).

Each connection may be associated with a weight or weight value (e.g., may have a weight). A weight or weight value may define coefficients applied to the computations. For example, the weights or weight values may be scaling factors between two or more nodes 105. Each node 105 may represent a summation of its inputs, and the weight or weight value associated with a connection may represent a coefficient or a scaling factor multiplied to an output of a node 105 in that connection. The weights between the nodes 105 may be determined, calculated, generated, assigned, learned, etc., during a training process for the neural network. For example, backpropagation may be used to set the weights such that the neural network 100 produces expected output values given corresponding values in labeled training data. Thus, the weights of the hidden layers can be considered as an encoding of meaningful patterns in the data. The weights of the connections between the nodes 105 may be modified by additional training.

Although neural network 100 is depicted with a particular number of nodes 105, layers, and connections, various neural network architectures/configurations may be used in other embodiments. For example, different fully connected neural networks and partially connected neural networks (e.g., where all nodes in adjacent layers are not connected) may be used.

Figure 2:
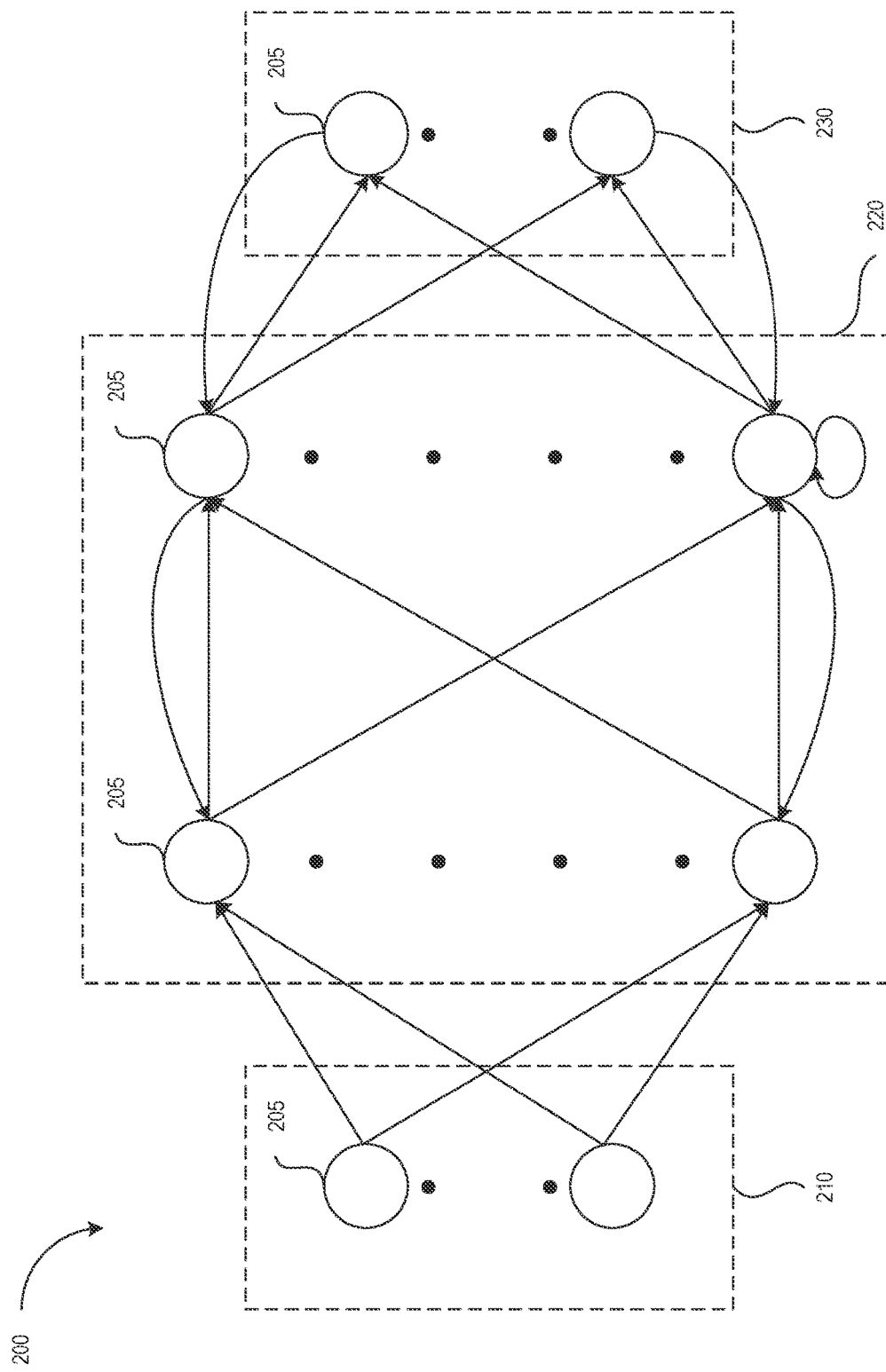
FIG. 2 is a diagram illustrating an example neural network in accordance with one or more embodiments of the present disclosure.

FIG. 2 is a diagram illustrating an example neural network 200, in accordance with one or more embodiments of the present disclosure. The neural network 200 may be used to model relationships between inputs and outputs or to find patterns in data, where the dependency between the inputs and the outputs may not be easily ascertained. The neural network 200 may also be a computing model that may be used to determine a feature in input data through various computations.

In another embodiment, the neural network 200 may be a RNN. A RNN may be a neural network where the connections between nodes may form a directed graph. A RNN may be a type of neural network where the connections between the nodes may form a cycle and/or may go in a backwards direction. For example, the signals, messages, data, information etc., may flow both forward (e.g., from left to right) and backwards (e.g., from right to left) between the nodes 205 of the neural network. The RNN may use memory units, such as long-short-term-memory (LSTM) units. The LSTM units may allow the RNN to backpropagate errors through layers (e.g., backwards through the layers or sub-layers) overtime. This may allow a RNN to exhibit temporal dynamic behavior. Although the present disclosure may refer to sequence analysis and/or prediction for RNNs, in other embodiments, the RNN may be used for other types of data and inputs.

The neural network 200 includes an input layer 210, a hidden layer 220, and an output layer 230. Each of the input layer 210, the hidden layer 220, and the output layer 230 includes one or more nodes 205. Each of the input layer 210, the hidden layer 220, and the output layer 230 may have a different number of nodes 205. The neural network 200 may be a deep neural network or a deep RNN. A neural network may be deep if the hidden layer 220 includes multiple levels (e.g., multiple columns of nodes 205, multiple sub-layers of nodes 205). As illustrated in FIG. 2, the neural network 200 includes two levels (or sub-layers) of nodes 205 (e.g., two columns of nodes 205). A RNN may be used for sequence analysis and/or prediction. For example, the RNN may recognize patterns in sequences of data, such as handwriting, text, numerical time series data, etc.

Each of the nodes 205 in a layer is connected to at least one other node, as represented by the arrows/lines between the nodes 205. Each connection may be associated with a weight or weight value (e.g., may have a weight). A weight or weight value may define coefficients applied to the computations. Each node 205 may represent a summation of its inputs, and the weight or weight value associated with a connection may represent a coefficient or a scaling factor multiplied to an output of a node 205 in that connection. The weights between the nodes 205 may be determined, calculated, generated, assigned, learned, etc., during a training process for the neural network. Thus, the weights of the hidden layers can be considered as an encoding of meaningful patterns in the data. The weights of the connections between the nodes 205 may be modified by additional training.

Although neural network 200 is depicted with a particular number of nodes 205, layers, and connections, various neural network architectures/configurations may be used in other embodiments. For example, different fully connected neural networks and partially connected neural networks (e.g., where all nodes in adjacent layers are not connected) may be used.

Figure 3A:
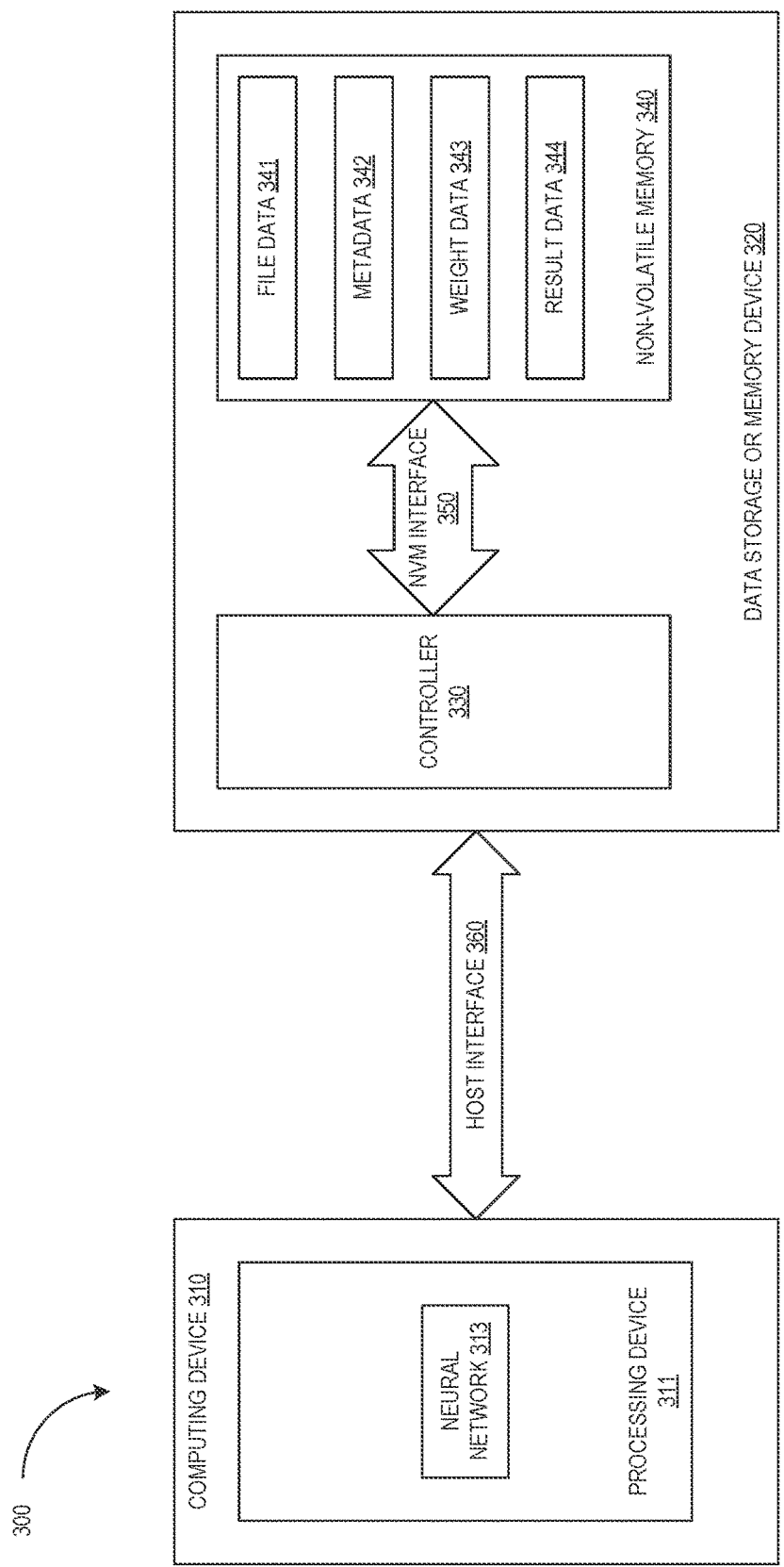
FIG. 3A is a diagram illustrating an example data storage or memory system, in accordance with one or more embodiments of the present disclosure.

FIG. 3A is a diagram illustrating an example data storage or memory system 300, in accordance with some embodiments of the present disclosure. The data storage or memory system 300 includes a computing device 310 and a data storage or memory device 320. The computing device 310 may also be referred to as a host system. In one embodiment, the data storage or memory device 320 may be part of the computing device 310 (e.g., may be located inside of a housing, chassis, case, etc., of the computing device 310). In another example, the data storage or memory device 320 may be separate from the computing device 310 (e.g., may be an external device that is coupled to the computing device 310 via a cable, such as a universal serial bus (USB) cable).

The data storage or memory device 320 may incorporate access command scheduling and/or execution in accordance with embodiments, examples, and/or implementations disclosed herein. The data storage or memory device 320 may be any type of data storage or memory device, drive, module, component, system, or the like. Furthermore, the terms "drive" and "data storage drive" may be used herein in certain contexts to refer to any type of data storage or memory device, and may be used substantially interchangeably with the term "data storage or memory device" herein in connection with various embodiments and/or in various contexts. As shown, the data storage or memory device 320 (e.g., hybrid hard drive, solid-state drive, any storage device utilizing solid-state memory, a hard disk drive, any storage device utilizing magnetic media/medium, etc.) includes a controller 330 (e.g., control circuitry, software, firmware, or a combination thereof) and a non-volatile memory 340.

The non-volatile memory (NVM) 340 may be configured for long-term storage of data and may retain data between power on/off cycles of the data storage or memory device 320. The non-volatile memory 340 and/or portions of the non-volatile memory 340 may also be referred to as a storage medium. In some embodiments, the non-volatile memory 340 may include solid-state memory. Solid-state memory may comprise a wide variety of technologies, such as flash integrated circuits, Phase Change Memory (PC-RAM, PCM, or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, triple level cell (TLC) memory, X4 or quad-level cell (QLC) memory, etc.), three-dimensional (3D) NAND memory, NOR memory, EEPROM, Ferroelectric Memory (FeRAM), magnetoresistive RAM (MRAM), or other discrete solid-state memory chips. In other embodiments, the non-volatile memory 340 may include magnetic media (including shingle magnetic recording), optical disks, floppy disks, electrically programmable read only memories (EPROM), electrically erasable programmable read only memories (EEPROM), etc. Non-volatile memory that uses magnetic media/medium may include one or more magnetic platters. Each platter may contain one or more regions of one or more tracks of data. The non-volatile memory 340 may include any combination of the one or more types of memories described here. The non-volatile memory 340 may be divided logically and/or physically into arrays, planes, blocks, pages, tracks, and sectors. While non-volatile memories are used as illustrative and teaching examples in this disclosure, those skilled in the art will recognize that various embodiments are applicable to volatile memories (e.g., Dynamic Random Access Memory (DRAM),) as well, as error correction codes are also used in those memories to protect data.

The controller 330 may include one or more processors, memory devices, data and/or power transmission channels/paths, boards, or the like. In some embodiments, the controller 330 may be implemented as one or more system-on-a-chip (SoC) modules, field-programmable gate array (FPGA) modules, application-specific integrated circuit (ASIC) modules, processing devices (e.g., processors), chips, or the like. In other embodiments, one or more components of the controller 330 may be mounted on a printed circuit board (PCB). The controller 330 may be configured to receive data commands from a storage interface (e.g., a device driver) residing on the computing device 310.

The controller 330 may communicate with the computing device 310 over a host interface 360, and may receive commands via the host interface 360. These commands may be referred to as data commands, data access commands, data storage access commands, etc. Data commands may specify a block address in the data storage or memory device 320. Data may be accessed/transferred based on such data commands. For example, the controller 330 may receive data commands (from the computing device 310) and may execute such commands on/in the non-volatile memory 340 (e.g., in one or more arrays, pages, blocks, sectors, etc.). The data commands received from computing device 310 may include read data commands, write data commands, and erase data commands. The controller 330 may be coupled to the non-volatile memory (NVM) 340 via a NVM interface 350. In one embodiment, the NVM interface 350 may include a plurality of channels (e.g., one or more lines, pines, wires, traces, etc.) and each channel may be coupled to different portions of the non-volatile memory 340 (e.g., different NVM arrays, different flash arrays, etc.).

The controller 330 may execute the received data commands to read, write, and erase data from non-volatile memory 340, via the NVM interface 350. For example, the commands may include a read command (e.g. a data read command) to read a block of data from the non-volatile memory 340. The controller 330 may read the data from the page and may transmit the data to the computing device 310 via the host interface 360. In another example, the commands may include a write command (e.g., a data write command) to write data to a page in a non-volatile memory 340. In one embodiment, write commands may include program commands (e.g., a command to write the value "1" to a location the non-volatile memory 340) and erase commands (e.g., a command to write the value "0" to a location, a page, a block, etc., in the non-volatile memory array). The controller 330 may receive the data from the computing device 310 via the host interface 360 and may write the data to the page. The host interface 360 may include hardware (e.g., wires, pins, traces, connectors, etc.), software (e.g., drivers), firmware, or a combination thereof, that allows the processing device 311 and/or the computing device 310 to communicate data with the data storage or memory device 320. Examples of a host interface may include a peripheral component interconnect express (PCIe) bus, a serial AT attachment (SATA) bus, a non-volatile memory express (NVME) bus, etc.

The data storage or memory device 320 may store data received from the computing device 310 such that the data storage or memory device 320 acts as data storage for the computing device 310. To facilitate this function, the controller 330 may implement a logical interface. The logical interface may present to the computing device memory a set of logical addresses (e.g., sequential/contiguous addresses) where data may be stored. Internally, the controller 330 may map logical addresses to various physical memory addresses in the non-volatile memory arrays and/or other memory module(s). Mapping data indicating the mapping of logical addresses to physical memory addresses may be maintained in the data storage or memory device. For example, mapping table data may be stored in non-volatile memory 340 in order to allow for recreation of mapping tables following a power cycle.

The controller 330 may encode data when storing the data on the non-volatile memory 340. The controller 330 may encode the data to protect the data from errors, loss, corruption, etc. The controller 330 may protect the data from errors, loss, corruption, etc., using various methods, techniques, functions, operations, actions, etc. In one embodiment, the controller 330 may protect the data by generating parity data (e.g., parity bits). The parity data may allow the controller 330 to determine whether there are errors in the data (e.g., errors due to corruption, damaged cells, damaged blocks, error while reading the data, etc.). The parity data (e.g., one or more parity bits) may be generated using various algorithms, techniques, functions, operations, etc. In another embodiment, the controller 330 may use an ECC to generate codewords. The codewords may also allow the controller 330 (e.g., the decoder 132) to correct or recover from errors in the codewords.

The controller 330 may also decode data that stored on the non-volatile memory 340. In one embodiment, the decoder 132 may decode codewords which encode the data that is stored on the non-volatile memory 340. In another embodiment, the decoder 132 may perform error detection to determine the integrity of data retrieved from non-volatile memory 340 (e.g., to determine whether the data has errors). For example, the decoder 132 may use parity data to check the data to determine whether there is an error in the data (e.g., whether one or more bits in the data are incorrect due to corruption, damage cells, damaged blocks, etc.).

As illustrated in FIG. 1, the computing device 310 includes, executes or otherwise implements a neural network 313. In one embodiment, the processing device 311 may execute or run the neural network 313. For example, the processing device 311 may construct the neural network 313 and may provide input data to the neural network 313. The neural network 313 may be used in machine learning tasks. In some embodiments, the neural network 313 may include a collection of connected and/or interconnected nodes. The nodes may also be referred to as neurons. Each node may transmit a signal, messages, data, information, etc., to one or more other nodes. A node may receive a signal, message, data, information, etc., from another node and may generate additional signals, messages, data, information, etc., to transmit to other nodes that are connected to it. The neural network 313 may be a computing model that may be used to determine a feature in input data through various computations. The neural network 313 may determine a feature (e.g., a number, shape, pattern, etc.) in input data (e.g., audio data, image data, video data, etc.) according to a structure that defines a sequence of computations to be performed, and weight values that define coefficients applied to the computations.

The neural network 313 may also include weights or weight values. The weights or weight values may be scaling factors between two or more nodes. The scaling factors may be applied to corresponding inputs or outputs of the nodes. For example, a weight value associated with a connection may represent a coefficient or a scaling factor multiplied to an output of a node in that connection. The structure of the neural network 313 may define connections of different nodes with corresponding inputs and outputs. The weight values may define scaling factors applied to corresponding inputs or outputs of the nodes. A weight value may also be associated with a connection between a first node and a second node. The weight value associated with the connection may represent a coefficient or a scaling factor that is multiplied to an output of the first node and the output of the first node is provided to an input of the second node.

In one embodiment, the neural network 313 may be a convolutional neural network (CNN). A CNN may be a feed forward neural network. A feed forward neural network may be a type of neural network where the connections between the nodes do not form a cycle. For example, the signals, messages, data, information etc., flow forward from the input nodes, through the hidden nodes, to the output nodes of the CNN. CNNs are discussed in more detail below.

In another embodiment, the neural network 313 may be a recurrent neural network (RNN). A RNN may be a neural network where the connections between nodes may form a directed graph. A RNN may be a type of neural network where the connections between the nodes may form a cycle. For example, the node of a RNN may be directed back towards a node in a previous layer or sub-layer. This may allow a RNN to exhibit temporal dynamic behavior.

As illustrated in FIG. 3A, the non-volatile memory 340 includes weight data 343 (e.g., the weight data 343 is stored in portions of the non-volatile memory 340). In one embodiment, the processing device 311 may construct the neural network 313 based on weight data 343. The weight data 343 may be data that indicates the structure of the neural network 313. For example, the neural network 313 may include a plurality of nodes and various connections between the plurality of nodes, as discussed below. The weight data 343 may indicate or identify the different nodes of the neural network 313. The weight data 343 may also indicate how the nodes of the plurality of nodes are connected to each other (e.g., may indicate interconnections between the plurality of nodes). For example, the weight data 343 may define connections between different nodes with corresponding inputs and outputs.

In another embodiment, the weight data 343 may indicate the weights or weight values associated with nodes or connections between the nodes. For example, the weight data 343 may indicate a weight (e.g., a scaling factor, a multiplier, etc.), that may be applied to the connections between the nodes. As discussed above, the weight may be applied to the output of a first node that is connected to a second node. The weight data 343 may indicate a set of weights (e.g., one or more weights) for the neural network 313. Each weight in the set of weights may be associated with a connection between nodes in the neural network 313.

In one embodiment, the processing device 311 may obtain the weight data 343 (e.g., the weights associated with the connections and/or nodes of the neural network 313) by training the neural network based on training data. For example, the processing device 311 may construct the neural network 313 with an initial structure (e.g., an initial set of connections between various nodes) and may use a set of initial weights. The initial structure and initial weights may be determined based on user input, default settings/parameters, etc. The processing device 311 may receive training data and may train the neural network 313 by providing the input data to the neural network 313 and applying the neural network 313 on the training data (e.g., by processing the training data using the neural network 313). The training data may be a large data set (e.g., millions of files) that may be applied or provided to the neural network 313 to train the neural network 313 to detect one or more features (e.g., one or more target features). The processing device 311 may update the structure of the neural network 313 (e.g., update how the nodes of the neural network 313 are connected) and/or may update the weights of the neural network 313 (e.g., update the values of the weights that are associated with the nodes and/or connections of the neural network 313). Once the neural network 313 is trained, the processing device 311 may store the updated (e.g., trained) structure of the neural network 313 and the updated (e.g., trained) weights in the weight data 343. Generally, the weight data 343 may be larger (e.g., may use more storage space) than the weight data 343.

In one embodiment, a dropout technique may be used when training the neural network 313. The dropout technique may ignore, deactivate, not use, etc., one or more nodes of the neural network 313 during the training of the neural network 313. The weights that originate from and/or lead to nodes (which are dropped out, ignored, deactivated) may also be ignored, deactivated, unused, etc. The dropout technique may help prevent over-fitting. Over-fitting may refer to a situation where the neural network may be too closely tied to or fitted to the training data, thus reduce the accuracy of the neural network on other input data.

In one embodiment, the weights that are used by the neural network 313 could be analyzed and ranked by importance according to one or more evaluation metrics. One or more weights that may be less relevant to the performance of the neural network 313 (e.g., that affect the accuracy of the inferences or results generated by the neural network 313 less) could be pruned. For example, less important weights may be removed by maintaining a threshold level of accuracy for the results generated by the neural network 313. In some embodiments, one or more of the processing device 311 and the controller 330 may identify weights that may be removed. In other embodiments, the controller 330 and/or the processing device 311 may receive the removable weights from another device. For example, the controller 330 may receive the removable weights from the processing device 311. In another example, the processing device 311 may receive the removable weights from another computing device (e.g., from a server computer). Various embodiments may use different techniques, algorithms, methods, etc., for identifying weights that may be pruned from the neural network 313. The weights that may be pruned from the neural network may be referred to as prunable weights. Removing or pruning the weights from the neural network 313 may reduce the amount of data used to store the weights for the neural network 313.

As illustrated in FIG. 3A, the non-volatile memory 340 includes file data 341, metadata 342, weight data 343, and result data 344. The file data 341 may include input data that may be processed and/or analyzed by the neural network 313. For example, the file data 341 may include various image files (e.g., digital images, digital pictures, etc.), that may be analyzed by the neural network 313. The neural network 313 may analyze the image files to determine the content of the images files. For example, the neural network 313 may analyze the images to determine what is illustrated or shown in the images (e.g., a picture of a cat, a picture of a boy playing in a park, etc.). The neural network 313 may store data generated by the neural network in the result data 344. For example, the result data 344 may be a table, a list, etc., indicating the content of the file data 341 that was determined by the neural network 313. The result data 344 may be the output of the neural network 313, which may be represented in various formats. For example, the result data 344 may be a table or list of file names (e.g., image file names) and the content of the files (e.g., descriptions of what is in the image files). The metadata 342 may be file system metadata for the file data 341. For example, the metadata 342 may include file names, file types (e.g., file format), timestamps (e.g., last edited timestamp, list accessed timestamp, created timestamp, etc.), file size, file owner/creator, etc. The file data 341, the metadata 342, the weight data 343, and the result data 344 may be stored in different portions of the non-volatile memory 340 and/or different types of non-volatile memory, as discussed in more detail below.

In one embodiment, the controller 330 may receive information that may indicate the type of data that is being stored on the data storage or memory device 320. For example, the controller 330 may not be aware that data that is being stored is a weight used by the neural network 313. The computing device 310 and/or the processing device 311 may provide the controller 330 with additional data or information indicating the type of data that is being accessed (e.g., stored) on the data storage or memory device 320. For example, NVME directives may be used to provide the controller 310 with information about the type of data that is being accessed or stored by the controller 310. An NVME directive may be a type of command (e.g., access command) that allows the computing device 310 and/or the processing device 311 to provide the controller 310 with additional information indicating the type of data that is being accessed.

As discussed above a data storage or memory device may store all of the data in the data storage or memory device in a conventional or standard manner. For example, the data storage or memory device may use the same ECC to store all of the data in the data storage or memory device. Or the data storage or memory device may include or use one type of memory to store all of the data in the data storage or memory device. However, different types of data may be more important than other types of data. For example, the weights of a neural network may be more important than the input files and should be protected more because generating the weights for the neural network may be a time consuming and/or expensive process. In another example, the results generated by a neural network may be important than the input files and should be protected more because generating the results may also be a time consuming and/or expensive process. In addition, different types of data may be accessed or modified more frequently. For example, certain weights may be updated more frequently as the neural network 313 is trained on new training data.

In some embodiments, the various types of data (e.g., file data 341, the metadata 342, the weight data 343, and the result data 344) may be divided into different hierarchies or levels. The hierarchies or levels may group different types of data together. Data in different hierarchies or levels may be stored in different types of memory and/or different portions of memory. The different portions and/or types of memory may be configured differently and/or may have different characteristics or properties. For example, a portion of memory may be configured to longer retention but may not be configured to faster access time because the data store in that portion of memory may not be frequently accessed. In another example, weight data 343 may be more important than other types of data so weight data 343 may be stored in a type of memory that has higher reliability (e.g., that has few instances of failures or errors). In a further example, weight data 343 may be more frequently accessed than other types of data and the weight data 343 may be stored in a type of memory that has faster access times (e.g., lower latency). In yet another example, data that should be accessed more quickly (e.g., with lower latency) may be encoded/decoded using a weaker ECC. By varying the types and/or portions of the memory, and by varying the configuration, characteristics, and/or properties of the portions of memory, the data storage or memory device 320 may be able to access (e.g., read, store, delete, etc.) data that is used by the neural network 313, more quickly and/or efficiently.

Although the examples, implementations, and/or embodiments disclosed herein may refer to a non-volatile memory 340 (e.g., flash memory, SCM, etc.), other types of memory may be used in other embodiments. A volatile memory (e.g., random-access memory (RAM)) may be used in addition to and/or in place of non-volatile memory 340 in other embodiments. For example, there may be different types of volatile memory used in the data storage or memory system 300 (e.g., dynamic RAM (DRAM) and static RAM (SRAM)). The file data 341, metadata 342, weight data 343, and result data 344 may be stored on different types of volatile memory and/or different portions of a type of volatile memory. In another example, both flash memory and DRAM may be used in the data storage or memory system 300. In a further example, multiple types of flash memory and multiple types of RAM may be used the data storage or memory system 300.

Figure 3B:
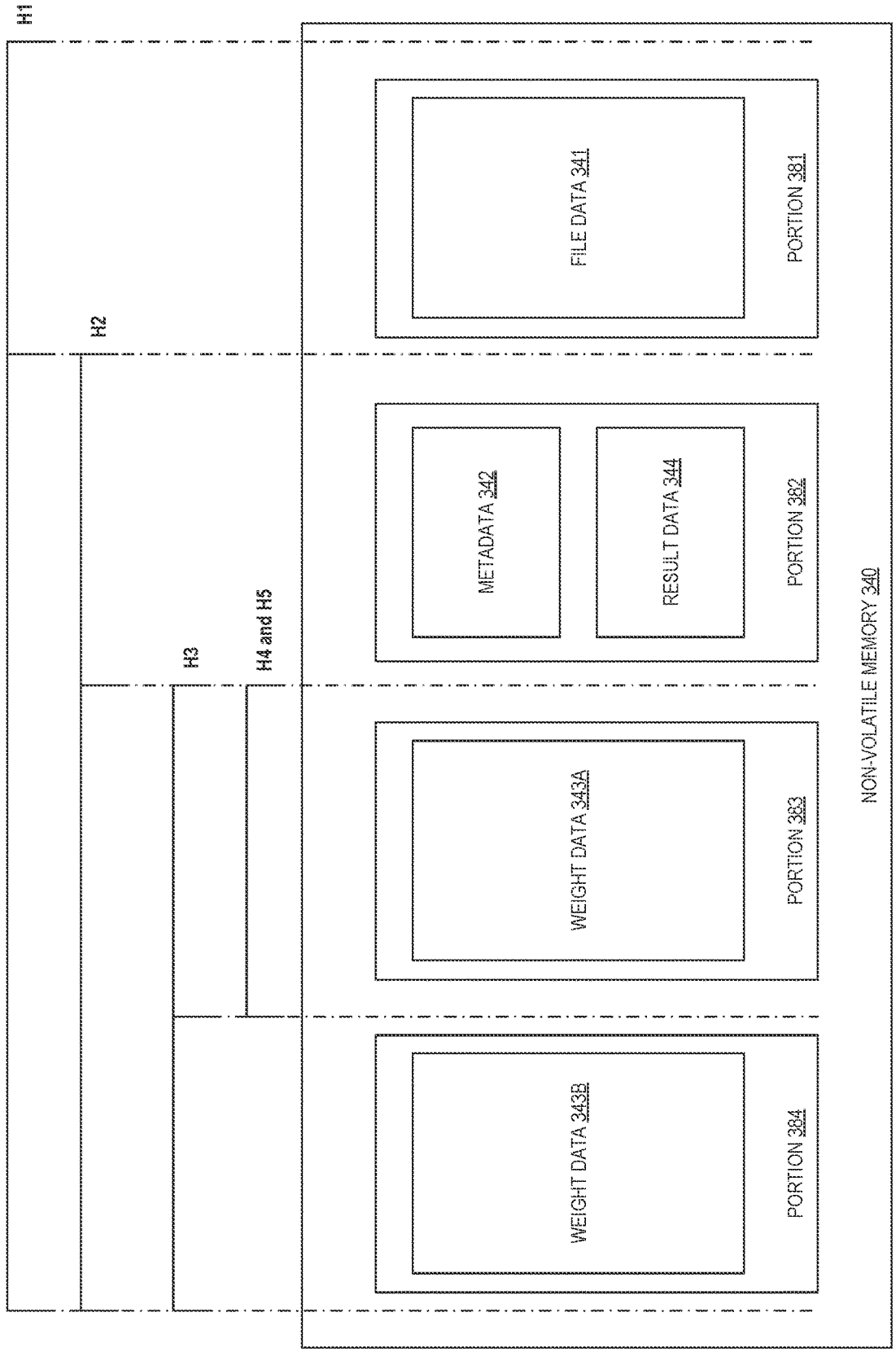
FIG. 3B is a diagram illustrating an example non-volatile memory, in accordance with one or more embodiments of the present disclosure.

FIG. 3B is a diagram illustrating an example non-volatile memory 340, in accordance with one or more embodiments of the present disclosure. The non-volatile memory 340 may be included in a data storage or memory device 320, as illustrated in FIG. 3A. The non-volatile memory 340 may be coupled to a controller 330 via a NVM interface 350, as illustrated in FIG. 3A. The non-volatile memory 340 is divided into portion 381, portion 382, portion 383, and portion 384.

As discussed above, the data stored in the non-volatile memory 340 may be logically organized and/or divided into different hierarchies or levels of data. Different hierarchies and/or levels of data may be stored in different portions of the non-volatile memory 340 (e.g., in one or more of portions 381 through 384). In one embodiment, the different portions of memory may be different sets/groups of blocks, pages, dies (e.g., a memory die, a semiconductor die, a flash die, a NAND die, a flash chip, etc.). In another embodiment, the different portions of memory may be different types of memory that are included in the non-volatile memory. For example, one portion of the non-volatile memory 340 may be a storage class memory (SCM) and another portion of the memory may be SLC NAND memory. In another example, one portion of the volatile memory 340 may be a 3D TLC NAND memory and another portion of the memory may be pseudo-MLC (pMLC) memory. The non-volatile memory 340 may include any number and/or combination of different types of memory, including but not limited to, SLC NAND flash memory, MLC NANA flash memory, TLC NAND flash memory, pSLC memory, pMLC memory, SCM (including resistive RAM (ReRAM), PCM, MRAM, etc.) or any other appropriate type of memory.

In one embodiment, in a first hierarchy (or level) H1 the data stored in the non-volatile memory 340 may be divided into two groups of data. The first group of data may include file data 341. The second group of data may include metadata 342, result data 344, and weight data 343A and 343B (which may be referred to as weight data 343 in FIG. 3A). As discussed above, the metadata 342, weight data 343A-343B, and result data 344 may be more important and/or useful to the neural network 313. For example, if weight data 343A-343B is lost, regenerating the weight data 343A-343B may take additional time because it takes additional time to retrain the neural network 313. In another example, if the result data 344 is lost or corrupted, regenerating the result data 344 may also take additional time because it takes additional time for the neural network 313 to reanalyze the file data 341 and regenerate the result data 344. The first group of data (e.g., the file data 341) may be stored on portion 381 and the second group of data (e.g., metadata 342, result data 344, and weight data 343A and 343B) may be stored on portions 382 through 384. Portions 381 and portions 382 through 384 may be different types of memory. For example, portion 381 may be 3D TLC NAND memory and portions 382 through 384 may be pSLC memory, pMLC memory, SCM, etc.

In one embodiment, one or more of metadata 342, result data 344, and weight data 343A and 343B may be duplicated across different portions of the non-volatile memory 340. For example, there may be multiple copies of the metadata 342, the result data 344, and the weight data 343A and 343B and the multiple copies may be distributed across different dies of the non-volatile memory 340. This may allow the controller 330 to access the metadata 342, the result data 344, and the weight data 343A and 343B more quickly and/or efficiently, as discussed in more detail below.

In one embodiment, in a second hierarchy (or level) H2, the data stored in the non-volatile memory 340 may be further divided into two groups of data. The first group of data may include metadata 342 and result data 344. The second group of data may include weight data 343A and 343B (e.g., weight data 343). The first group of data (e.g., metadata 342 and result data 344) may be stored on portion 382 and the second group of data (e.g., weight data 343A and 343B) may be stored on portions 383 through 384. Portions 382 through 384 may be different types of memory. For example, portion 382 may be MLC memory and portions 383 and 384 may be SCM.

In one embodiment, in a third hierarchy (or level) H3, the data stored in the non-volatile memory 340 may be further divided into two groups of data. For example, the weight data 343 may be divided into weight data 343A and weight data 343B. The controller 330 may obtain a set of weights for neural network 313. For example, the controller 330 may receive the weights for the neural network 313 from a computing device (e.g., computing device 310 illustrated in FIG. 3A). As discussed above, the neural network 313 may include a plurality of nodes and a plurality of connections that interconnect the nodes, as discussed above. The set of weights may be included in the weight data 343A and 343B.

In one embodiment, the controller 330 may identify a first subset of weights (e.g., weight data 343A) and a second subset of weights (e.g., weight data 343B) from the set of weights. For example, the controller 330 may identify a first subset of weights (from the set of weights) that may be used by the neural network 313 when analyzing input data and/or input files. The first subset of weights may be weights that may not be pruned. The first subset of weights may be included in weight data 343A.

The controller 330 may also identify a second subset of weights that may include weights which may be pruned from the neural network 313 (e.g., may be prunable weights). For example, to reduce the amount of space (e.g., storage space) for storing the weights of the neural network 313, some of the weight may be pruned or removed, as discussed above. The second set of subset of weights may be included in weight data 343B.

In some embodiments, the controller 330 may identify the first subset of weights and the second subset of weights (e.g., weight data 343A and 343B respectively) based on data indicating the first subset and the second subset of weights. For example, the controller 330 may receive data (e.g., an NVME directive, a list of weights, or other appropriate data etc.) that may indicate which weights are in the first subset of weights and which weights are in the second subset of weights.

In one embodiment, weight data 343A (e.g., the first subset of weights) may be stored in portion 383 of the non-volatile memory 340. For example, weight data 343A may be stored a first set of dies. In another example, weight data 343A may be stored on a set of blocks, pages, etc., of the non-volatile memory. Weight data 343B (e.g., the second subset of weights) may be stored in portion 384 of the non-volatile memory 340. For example, the second subset of weights may be stored on a second set of dies, a second set of blocks, pages, etc.

In one embodiment, different ECCs may be used for the different portions of the non-volatile memory 340 to protect weight data 343A through 343B from damage, loss, corruptions, etc. For example, a first ECC may be used to protect the weight data 343A stored in portion 383 of the non-volatile memory 340 and a second, different ECC may be used to protect weight data 343B stored in the portion 384 non-volatile memory 340. The first ECC (used for the first portion of the non-volatile memory 340) may be stronger than the second ECC (used for the second portion of the non-volatile memory 340). For example, the code rate of the first ECC (e.g., the ratio of bits of data to the total bits of a code word) may be smaller than the code rate of the second ECC (e.g., the first ECC is stronger than the second ECC, or the second ECC is weaker than the first ECC).

In one embodiment, different amounts of overprovisioning may be used for the different portions of the non-volatile memory 340. For example, the portion of the non-volatile memory 340 used to store weight data 343A may use less overprovisioning than the amount of overprovisioning used in the portion of the non-volatile memory 340 used to store weight data 343B (e.g., prunable weights). Overprovisioning may occur when the controller 330 allocates more space in the non-volatile memory 340 for data than the actual size of the data (e.g., allocating 2 kilobytes to store 1.5 kilobytes worth of data). Overprovisioning may help increase the endurance of flash memory (e.g., NAND memory) that may be included in the non-volatile memory 340. Because the second set of weights may change more frequently (e.g., the weights that are identified as prunable may change over time), using more overprovisioning in the portion of the non-volatile memory that may be used to store the second set of weights may increase the endurance of that portion of the non-volatile memory.

In one embodiment, in a fourth hierarchy (or level) H4, when weight data 343A (e.g., the first subset of weights) is be stored in portion 383 of the non-volatile memory 340, the first weight data 343A may be logically arranged into a bit array that includes columns and arrays of bits. Each row of the bit array may be a weight from the weight data 343A. For example, each row of the bit array may be a bit string (e.g., a series of bits) that represents a weight from the weight data 343A. Each bit in the bit string may have a bit position. The bit positions may have different bit significances. For example, the left most bit may be the most significant bit (MSB) and the right most bit may be the least significant bit (LSB), or vice versa. Each row of the bit array (e.g., each weight of the weight data 343A) may be aligned by bit position. For example, the first bit of each weight may be in a first column of the bit array, the second bit of each weight may be in a second column of the bit array, etc.

In one embodiment, in a fifth hierarchy (or level) H5, the columns of the bit array may be encoded and/or decoded using different ECCs. For example, the first column may be encoded using a first ECC, the second column may be encoded using a second ECC, the third column may be encoded using a third ECC, etc. Any combination and/or number of ECCs may be used to encode the columns of the bit array in different embodiments. For example, ECCs with different strengths may be used to encode/decode columns of the bit array based on their bit position or bit significance, as discussed in more detail below. The bit array and the ECCs that may be used to encode/decode the columns are discussed in more detail below.

In other embodiments, the number of hierarchies and/or the data that is associated with the different hierarchies may be different. For example, the importance of different types of data may depend on how the data is used or which application, service, process, etc., is using the data.

One or more of the embodiments, implementations, examples, etc., described herein may store data in different types and/or portions of the non-volatile memory 340 based on the type of data. The different types and/or portions of the non-volatile memory 340 may have different configurations, characteristics or parameters. For example, weights that may be modified more frequently may be stored in a more reliable type of memory with a weaker ECC to allow for faster access to those weights. In another example, file data (which may be less important than the weights of a neural network) and which may be modified less frequently may be stored in a less reliable type of memory with a stronger ECC. This may allow the controller 330 and/or data storage or memory device 320 to tune and/or optimize how different types of data are protected and/or how quickly different types of data may be accessed.

Figure 4:
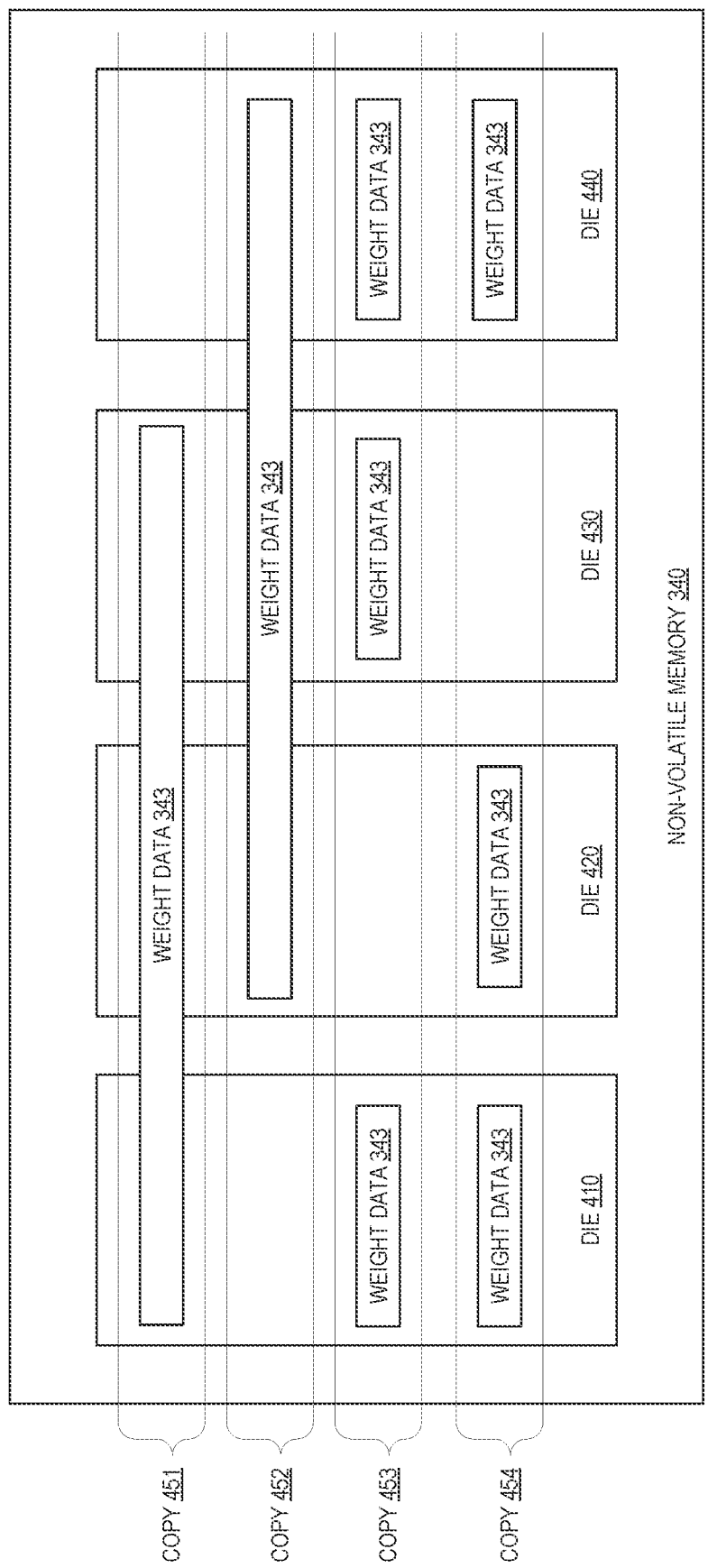
FIG. 4 is a diagram illustrating an example an example non-volatile memory, in accordance with one or more embodiments of the present disclosure.

FIG. 4 is a diagram illustrating an example non-volatile memory 340, in accordance with one or more embodiments of the present disclosure. The non-volatile memory 340 may be included in a data storage or memory device 320, as illustrated in FIG. 3A. The non-volatile memory 340 may be coupled to a controller 330 via a NVM interface 350, as illustrated in FIG. 3A. The non-volatile memory 340 includes die 410, die 420, die 430 and die 440. Each of the dies 410 through 440 may be a semiconductor die, a flash die, a NAND die, etc. A die may be a portion of the non-volatile memory 340 or may be a unit for dividing the non-volatile memory 340.

As illustrated in FIG. 4, the different copies of the weight data 343 may be stored in the non-volatile memory 340. For example, four copies, copy 451, copy 452, copy 453, and copy 454 of the weight data 343 are stored in the non-volatile memory 340. In one embodiment, the copies 451 through 454 of the weight data 343 may be distributed and/or duplicated across the dies 410 through 440. For example, copy 451 may be stored on dies 410 through 430, copy 452 may be stored on dies 420 through 440, copy 453 may be stored on die 410, die 430 and die 440, and copy 454 may be stored on die 410, die 420, and die 440.

With the multiple copies 451 through 454 of the weight data 343, the controller 330 may be able to optimize and/or improve the amount of time to access the weight data 343. For example, if a neural network accesses the weight data 343 to set the values of the weights in the neural network, the controller 330 may be able to retrieve the weight data 343 more quickly if the controller 330 retrieves different portions of the weight data 343 from different dies 410 through 440. For example, the controller 330 may be able to simultaneously retrieve a first third of the weight data 343 from the die 410, a second third of the weight data 343 from the die 430, and the last third of the weight data 343 from die 440. In another example, the controller 330 may be able to use the copies of the portions of the weight data 343 that have the fewest errors or bit error rate (BER). This may allow the controller 330 to spend less time correcting errors (e.g., using an ECC to correct an error). For example, rather than correcting an error in a portion of the weight data 343, the controller 330 may use another copy of the same portion of the weight data 343 (which may be retried from a different die) that does not have errors.

In one embodiment, the different copies of the weight data 343 may include different copies of weight data 343A and/or weight data 343B (which are discussed above in conjunction with FIG. 3B). For example, some copies include both weight data 343A and weight data 343B while other copies may include one of weight data 343A or weight data 343B. In addition, although weight data 343 is illustrated in FIG. 4, other types of data may be duplicated across the dies 410 through 440 of the non-volatile memory 340. For example, metadata 342 and/or result data 344 (which are discussed above in conjunction with FIG. 3B) may also be duplicated across the dies 410 through 440 of the non-volatile memory 340.

Figure 5:
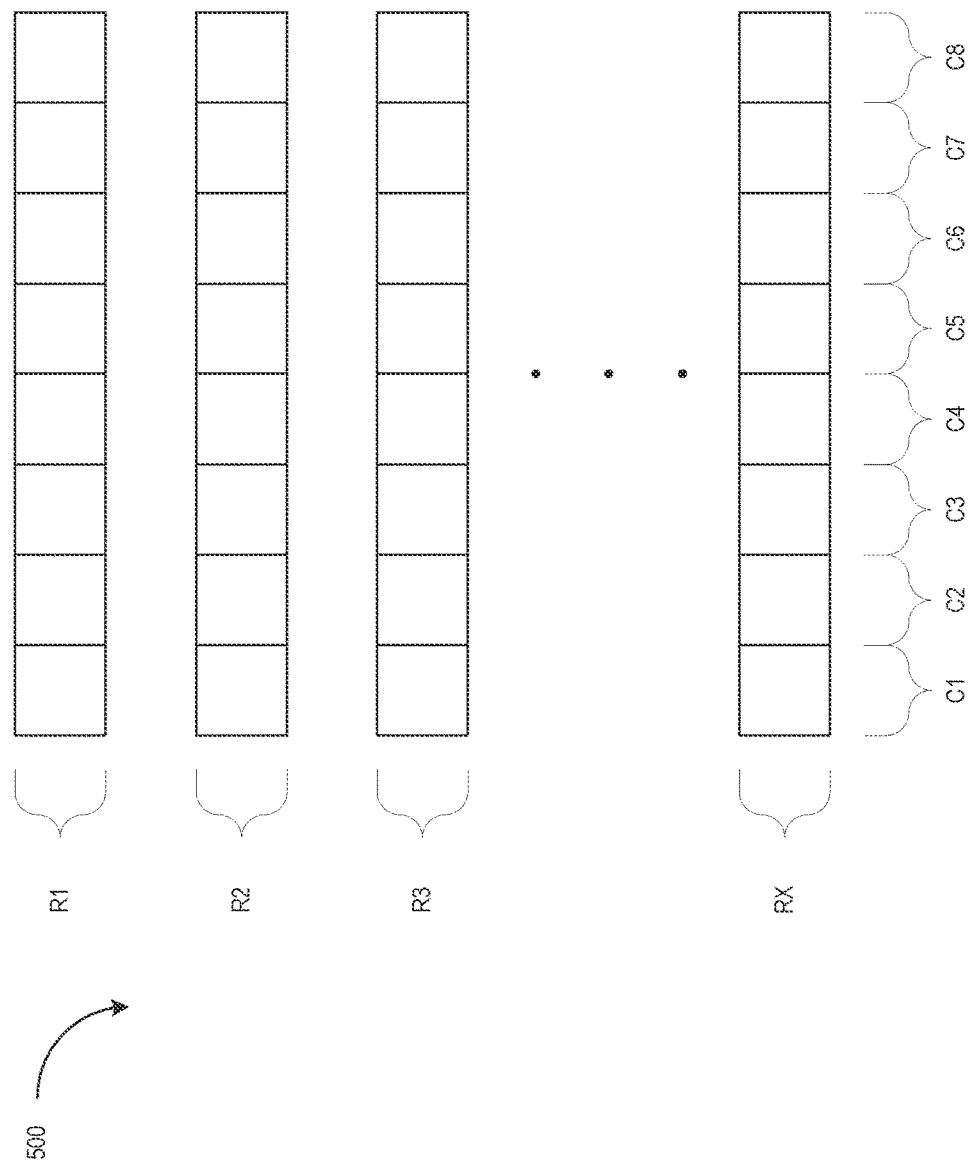
FIG. 5 is a diagram illustrating an example bit array, in accordance with one or more embodiments of the present disclosure.

FIG. 5 is a diagram illustrating an example bit array 500, in accordance with one or more embodiments of the present disclosure. The bit array 500 includes rows R1 through RX and columns C1 through C8. Each row may represent or may be a weight from a set of subset of weights. For example, each row R1 through RX may represent a weight from weight data 343A illustrated in FIG. 3B. Each row R1 through RX may in include a series of bits that represent the weight (e.g., a bit string, a binary value, etc.). The weights may be aligned by bit position. For example, the first column C1 may include the first bit for each weight or row R1 through RX, the second column C1 may include the second bit for each weight or row R1 through RX, etc. The columns C1 through C8 may also be referred to as stream, data streams, bit streams, etc.

The bit array 500 may represent the different weights in the weight data 343A. Each column C1 through C8 may indicate the bit position or bit significance for a weight in one of the rows R1 through RX. For example, column C1 may include the most significant (MSB) bits for the weights in the rows R1 through RX. The significance, importance, etc., of the bits may decrease starting with the highest bit significance at column C1 and the lowest bit significance at C8.

In one embodiment, different columns (e.g., streams) of bits may be encoded and/or decoded using different ECCs. For example, column C1 may be encoded using a first ECC, the column C2 may be encoded using a second ECC, the column C3 may be encoded using a third ECC, etc. In another example, columns C1 through C4 may be encoded/decoded using a first ECC and columns C4 through C8 may be encoded/decoded using a second ECC. Different numbers or combinations of ECCs may be used to encode/decode the columns C1 through C8 in other embodiments.

In one embodiment, the strength of the ECC may correspond to the bit significance or importance of a column. Columns associated with a lower bit significance may use weaker ECCs than columns associated with a higher bit significance. For example, the ECC used to encode/decode the bits in column C1 may be stronger than the ECC used to encode/decode the bits in column C8.

In one embodiment, the bits in columns associated with lower bit significances (or importance) may be updated more frequently than bits associated in columns associated with higher bit significance. This may be at least partly due to the nature weights in neural networks and how weights may be updated. For example, a server computing device (which may be referred to as a parameter server) may provide weights for a neural network to multiple other computing devices (which may be referred to as worker computing devices). The other computing devices may execute the neural network on various sets of input data to train the neural network (e.g., to update the weights). The other computing devices may transmit the updated weights to the server computing device and the server computing devices may update the weights that it previously provided to the other computing devices. Because of the way neural networks operate, the changes to the weights of the neural network may be incremental (e.g., may increase or decrease more slowly). Thus, the MSBs of a weight may not change but the LSBs of the weight may change due to the training performed on the other computing devices. By using a weaker ECC on the LSBs (e.g., the columns with lower bit significance), the controller 330 may be able to update the columns more quickly. For example, the controller may be able to encode and/or decode codewords more quickly if a weaker ECC is used.

Figure 6:
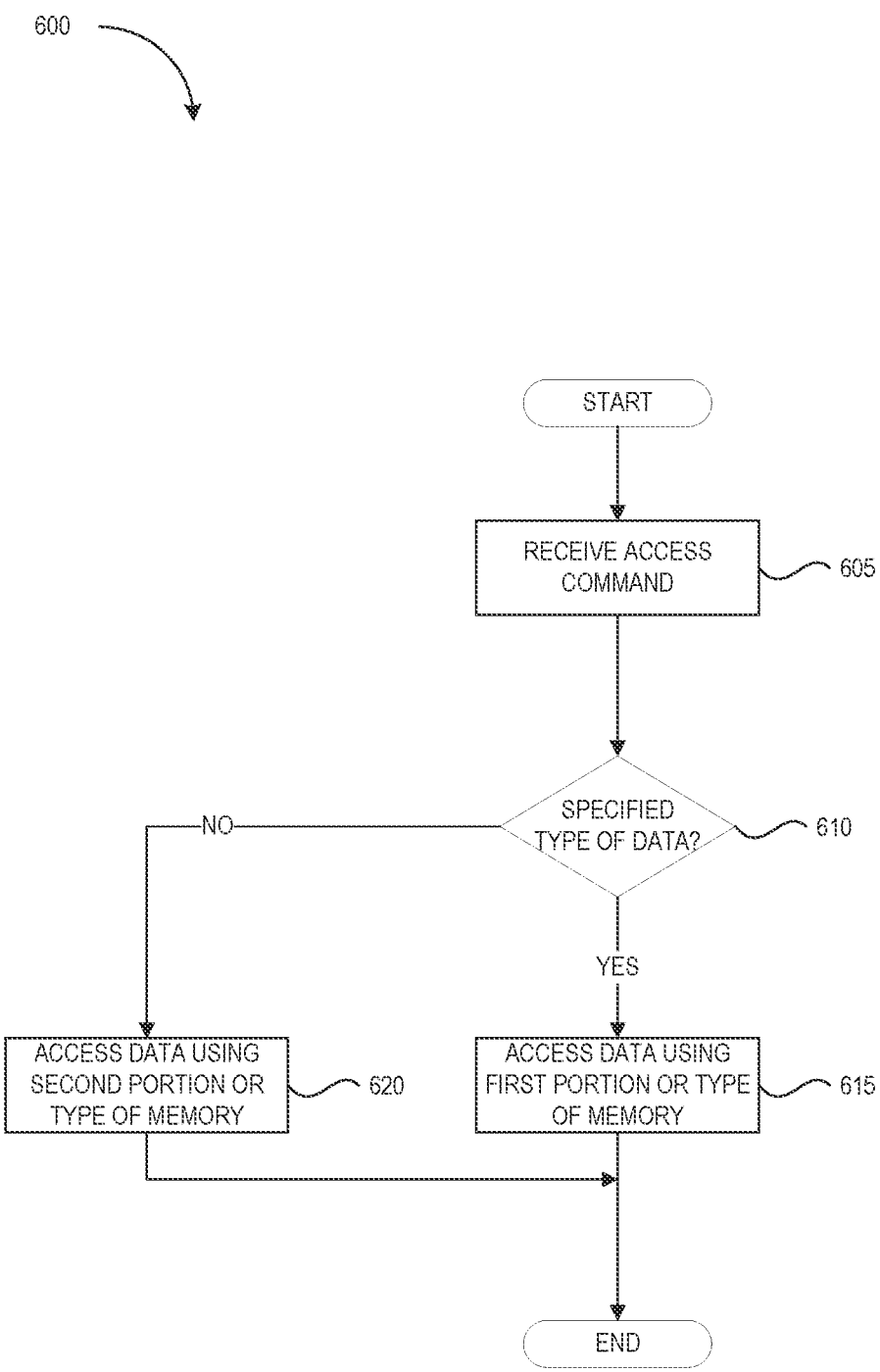
FIG. 6 is a flowchart illustrating an example a process for accessing data, in accordance with one or more embodiments of the present disclosure.

FIG. 6 is a flowchart illustrating an example a method 600 for accessing, in accordance with one or more embodiments of the present disclosure. The method 600 may be performed by a processing device (e.g., a processor, a central processing unit (CPU), a controller, an application-specific integrated circuit (ASIC), a field programmable gate array (FPGA), etc.), a neural network, etc. For example, the method 600 may be performed by a controller of a data storage or memory device. The controller, processing device, and/or neural network may be processing logic that includes hardware (e.g., circuitry, dedicated logic, programmable logic, microcode, etc.), software (e.g., instructions run on a processor to perform hardware simulation), firmware, or a combination thereof.

In one embodiment, the method 600 may be performed at one or more of hierarchies H1 or H2, as discussed above. The method 600 starts at block 605 where the method 600 receives an access command (e.g., a data command). For example, the access command may be a command to store data on a data storage or memory device. As discussed above the access command may include additional data or information about the data that is being accessed. For example, the access command may include a NVME directive indicating that the data that is being stored is weight data. At block 610, the method 600 determines whether the data is a specified or specific type of data. For example, the method 600 may determine whether the data is one or more of weight data, result data, or metadata. If the data is one the specified types of data, the method 600 may access the data using a first portion and/or type of memory. For example, if the data is weight data, the method 600 may store the data in SCM or pMLC memory. If the data is not one of the specified types of data, the method 600 may access the data using a second portion and/or type of memory. For example, if the data is not one or more of weight data, result data, or metadata (e.g., the data is file data), the method 600 may store the data using 3D NAND.

Figure 7:
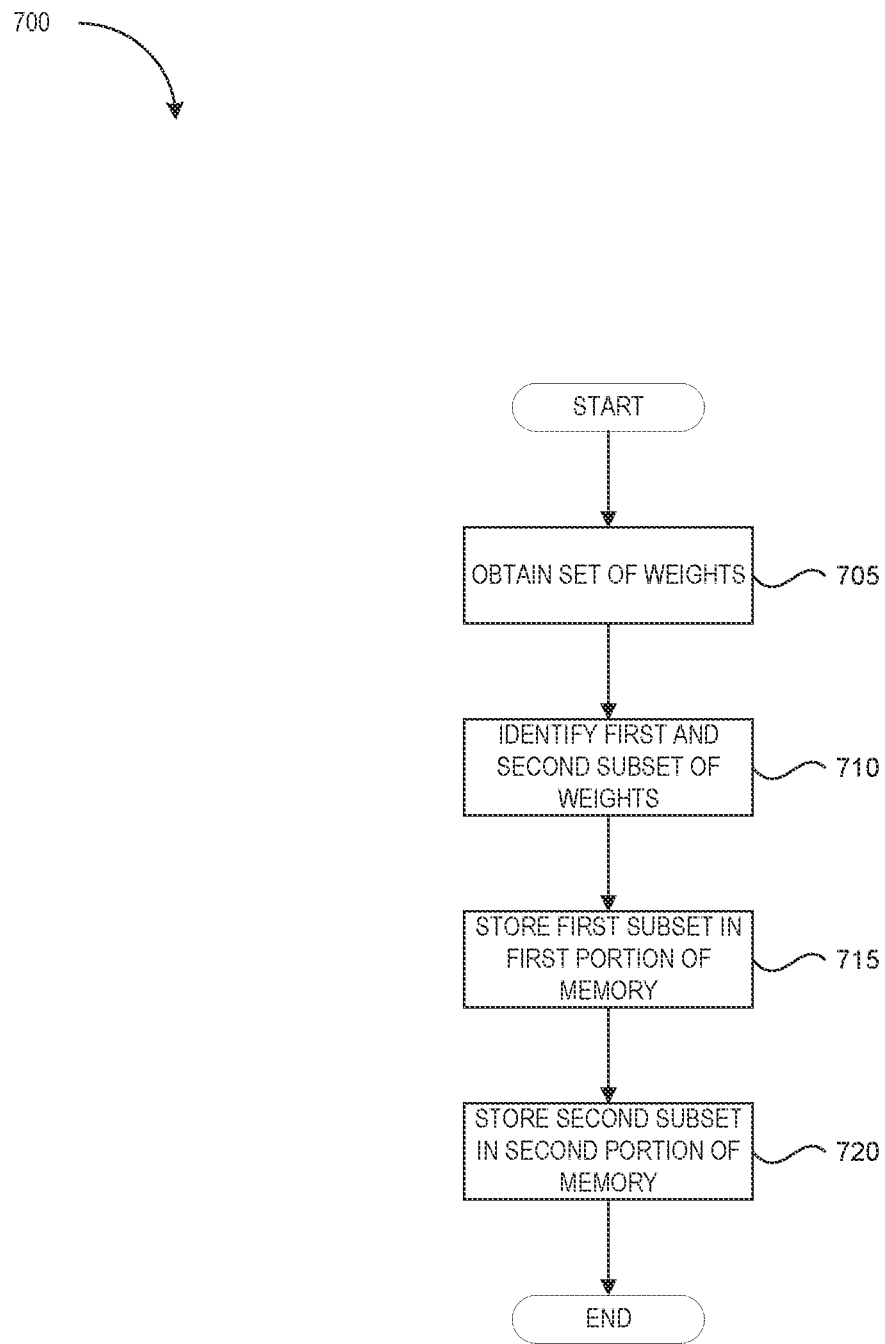
FIG. 7 is a flowchart illustrating an example a process for accessing data, in accordance with one or more embodiments of the present disclosure.

FIG. 7 is a flowchart illustrating an example a method 700 for accessing data, in accordance with one or more embodiments of the present disclosure. The method 700 may be performed by a processing device (e.g., a processor, a central processing unit (CPU), a controller, an application-specific integrated circuit (ASIC), a field programmable gate array (FPGA), etc.), a neural network, etc. For example, the method 700 may be performed by a controller of a data storage or memory device. The controller, processing device, and/or neural network may be processing logic that includes hardware (e.g., circuitry, dedicated logic, programmable logic, microcode, etc.), software (e.g., instructions run on a processor to perform hardware simulation), firmware, or a combination thereof.

In one embodiment, the method 700 may be performed at hierarchy H3, as discussed above. The method 700 starts at block 705 where the method 700 optionally obtains a set of weights for a neural network. For example, the method 700 may receive weight data that is to be stored on the data storage or memory device. At block 710, the method 700 may optionally identify a first subset of weights and a second subset of weights. For example, the method 700 may receive data (e.g., a list, a table, a NVME directive, or other appropriate data) that indicates which weights (of a plurality of weights) are in the first subset of weights and which weights (of the plurality of weights) are in the second subset of weights. The first subset of weights may be weights that will be used by the neural network (e.g., weight data 343A illustrated in FIG. 3B). For example, the first subset of weights may be weights that have not been identified as prunable weights. The second subset of weights may be weights that may prunable (e.g., weight data 343A illustrated in FIG. 3B). At block 715, the method 700 may store the first subset of weights in a first portion of the memory of the data storage or memory device. For example, the method 700 may store the first subset of weights in a portion of memory that uses less overprovisioning, stronger ECC, and/or may be more reliable. At block 720, the method 700 may store the second subset of weights in a second portion of the memory of the data storage or memory device. For example, the method 700 may store the second subset of weights in a portion of memory that uses more overprovisioning, weaker ECC, and/or may be less reliable.

Figure 8:
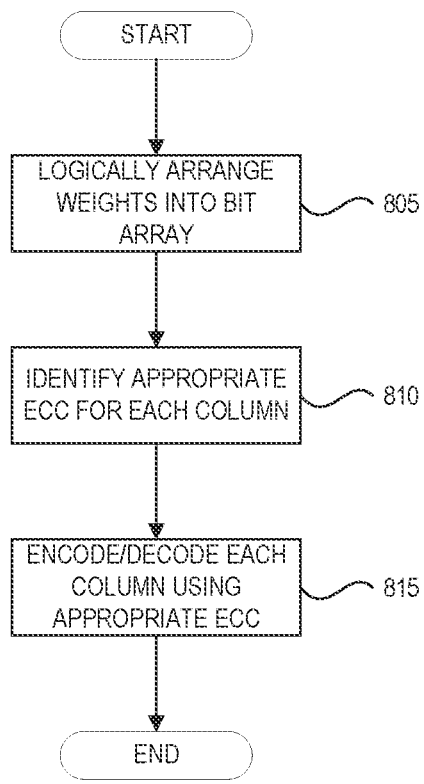
FIG. 8 is a flowchart illustrating an example a process for accessing data, in accordance with one or more embodiments of the present disclosure.

FIG. 8 is a flowchart illustrating an example a method 800 for accessing data, in accordance with one or more embodiments of the present disclosure. The method 800 may be performed by a processing device (e.g., a processor, a central processing unit (CPU), a controller, an application-specific integrated circuit (ASIC), a field programmable gate array (FPGA), etc.), a neural network, etc. For example, the method 800 may be performed by a controller of a data storage or memory device. The controller, processing device, and/or neural network may be processing logic that includes hardware (e.g., circuitry, dedicated logic, programmable logic, microcode, etc.), software (e.g., instructions run on a processor to perform hardware simulation), firmware, or a combination thereof.

In one embodiment, the method 800 may be performed one or more of hierarchies H4 and H5, as discussed above. The method 800 starts at block 805 where the method 800 logically arranges a set or subset of weights into a bit array. For example, referring to FIGS. 3B and 5, the method 800 may arrange the weights in weight data 343A into a bit array 500 that has columns and rows of bits. As discussed above, each row of the bit array may be or may represent a weight. The weights may be aligned by bit position. At block 810, the method 800 may identify an appropriate ECC for each column of the bit array. For example, the method 800 may identify ECCs with different strengths for different bit significances of the columns. At block 815, the method 800 may encode and/or decode each column using the appropriate ECC.

Figure 9:
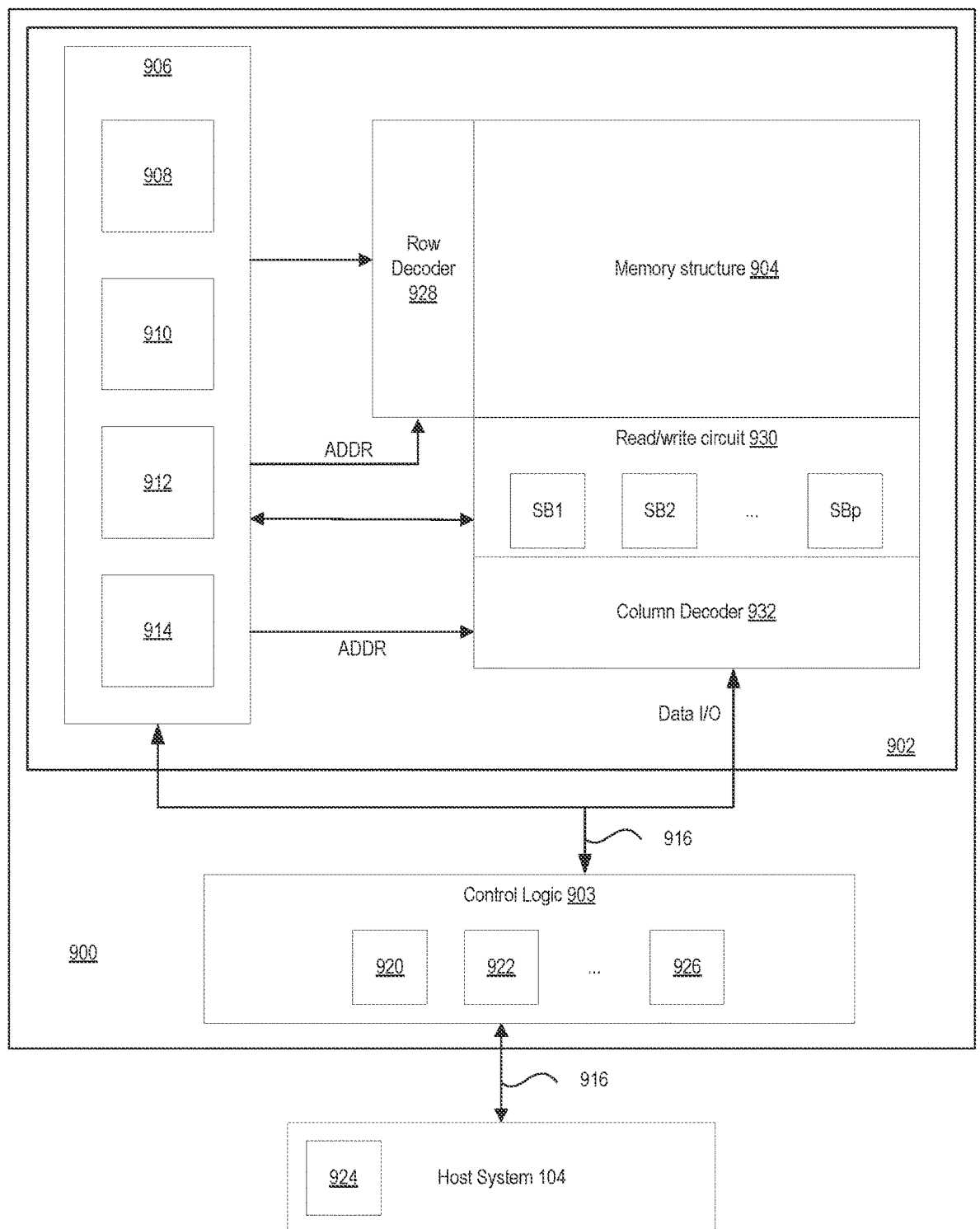
FIG. 9 is a block diagram of a non-volatile data storage or memory system, in accordance with one or more embodiments of the present disclosure.

FIG. 9 is a block diagram of an exemplary data storage or memory system 900, which may be similar to data storage or memory system 300 illustrated in FIG. 3A. The data storage or memory system 900 may include one or more memory die 902. The memory die 902 includes a memory structure 904 of memory cells, such as an array of memory cells herein referred to as a memory array, address controller 906, and read/write circuits 930. The memory structure 904 is addressable by word lines via a row decoder 928 and by bit lines via a column decoder 932. The read/write circuits 930 include multiple sense blocks SB1, SB2, . . . , SBp (sensing circuitry) and allow a page of memory cells to be read or programmed in parallel. Typically the memory system-based control logic 903 is included in the same non-volatile memory system 900 (e.g., a removable storage card) as the one or more memory die 902. Control commands and data (e.g., a raw video stream) are transferred between a host system and memory system-based control logic 903 via a data bus 918, and between the controller and the one or more memory die 902 via lines 916. The data bus 918 may for example be a PCIe serial memory bus.

The memory structure 904 can be 2D (laid out in a single fabrication plane) or 3D (laid out in multiple fabrication planes). The memory structure 904 may comprise one or more array of memory cells including a 3D array. In one embodiment, the memory structure 904 may comprise a monolithic three-dimensional memory structure (3D array) in which multiple memory levels are formed above (and not in) a single substrate, such as a wafer, with no intervening substrates. The memory structure 904 may comprise any type of non-volatile memory that is monolithically formed in one or more physical levels of arrays of memory cells having an active area disposed above a silicon substrate. The memory structure 904 may be in a non-volatile memory device (e.g., data storage or memory system 900) having circuitry associated with the operation of the memory cells, whether the associated circuitry is above or within the substrate.

The address controller 906 cooperates with the read/write circuits 930 to perform memory operations on memory cells of the memory structure 904, and includes a state machine 908, an address decoder 910, and a power control 914. The state machine 908 provides control of memory operations. A store region selector 912 may be provided, e.g., for programming parameters as described further below.

The address decoder 910 provides an address interface between that used by the host or a memory system-based control logic 903 to the hardware address used by the row decoder 928 and column decoder 932. The power control 914 controls the power and voltages supplied to the various control lines during memory operations. The power control 914 and/or read/write circuits 930 can include drivers for word lines, source gate select (SGS) transistors, drain gate select (DGS) transistors, bit lines, substrates (in 2D memory structures), charge pumps, and source lines. The sense blocks can include bit line drivers and sense amplifiers in one approach.

An SGS transistor is a select gate transistor at a source end of a memory string, and a DGS transistor is a select gate transistor at a drain end of a memory string.

In some implementations, some of the components can be combined. In various designs, one or more of the components (alone or in combination), other than memory structure 904, can be thought of as at least one control circuit or controller which is configured to perform the techniques described herein. For example, a control circuit may include any one of, or a combination of, address controller 906, state machine 908, address decoder 910, column decoder 932, power control 914, control processor 926, sense blocks SB1, SB2, . . . , SBp, read/write circuits 930, memory system-based control logic 903, and so forth.

The memory system-based control logic 903 may comprise a control processor 926 and memory devices such as controller read-only memory 920 and controller volatile memory 922.

The memory devices of the memory system-based control logic 903 may comprise code such as a set of instructions that configure the control processor 926 to execute the set of instructions to provide aspects of the functionality described herein. Alternatively or additionally, the control processor 926 can access code from the memory structure 904, such as a reserved area of memory cells in one or more word lines.

For example, code can be used by the memory system-based control logic 903 to access the memory structure 904, controller read-only memory 920, or controller volatile memory 922 for partial decoding and/or event detection logic. In some embodiments the control logic may utilize the host system volatile memory 924 for caching some or all of the raw video stream for partial decoding and event detection, using for example direct memory access technology (DMA) over the data bus 918. The control logic may further include drivers to perform basic tasks such as controlling and allocating memory, prioritizing the processing of instructions, and controlling input and output ports.

Generally, the control logic can include software and other logic (e.g., circuits, firmware) to perform the functions described herein. The control logic may comprise a sequencer to control the timing (start and stop times, durations, spacing etc.) of the various signals described herein. The state machine 908 may also be utilized to implement aspects of the control logic.

In one embodiment, the host system is a computing device (e.g., laptop, desktop, smartphone, tablet, digital camera) that includes one or more processors, one or more processor readable storage devices (host system volatile memory 924, ROM, flash memory, hard disk drive, solid state memory) that store processor readable code (e.g., software) for programming the one or more processors to perform aspects of the techniques described herein. The host system may also include additional system memory, one or more input/output interfaces and/or one or more input/output devices in communication with the one or more processors, as well as other components well known in the art.

The store region selector 912 may be a non-volatile memory such as NAND flash memory, or another type. The store region selector 912 identifies blocks of the memory structure 904 for reading and writing, among other things, as known in the art.

One of skill in the art will recognize that the non-volatile memory system 900 is an example and that various implementations will include additional components, or exclude or combine some of the illustrated components, in manners known in the art.

Although the present disclosure may refer to CNNs, RNNs, etc., other types of neural networks and/or machine learning methods, functions, techniques, operations, data structures, etc., may be used in other embodiments. For example, a probabilistic neural network may be used in other embodiments.

GENERAL COMMENTS

Those skilled in the art will appreciate that in some embodiments, other types of distributed data storage or memory systems may be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device, comprising:
   a memory comprising a plurality of dies; and
   a controller coupled to the memory, the controller configured to:
   organize data for a neural network across different portions of the memory; and
   store weight data wherein the weight data comprises a first and second subset of weights for use by the neural network, wherein:
   the first subset of weights is stored in a first portion of the memory, the first portion being configured to utilize a first error correction code;
   the second subset of weights is stored in a second portion of the memory, the second portion being configured to utilize a second error correction code configured to be different than the first error correction code, and wherein the second subset of weights comprises prunable weights, that are pruned until a predetermined threshold associated with an accuracy of the neural network is exceeded.

2. The device of claim 1, wherein the data is organized into two or more hierarchies across the different portions of the memory.

3. The device of claim 2, wherein the first subset of weights stored in the first portion of the memory is associated with one of the two or more hierarchies.

4. The device of claim 3, wherein the second subset of weights stored in the second portion of the memory is associated with another of the two or more hierarchies.

5. The device of claim 4, wherein the weight data is stored across the plurality of dies.

6. The device of claim 1, wherein the second error correction code is configured to be weaker than the first error correction code.

7. The device of claim 1, wherein the weights within the weight data are ranked based on a plurality of evaluation metrics.

8. The device of claim 7, wherein at least one of the plurality of evaluation metrics ranks the weights based on their effect on the accuracy of inferences or results generated by the neural network.

9. The device of claim 8, wherein weights below a predetermined ranking are selected for pruning.

10. A method, comprising:
    organizing data for a neural network into two or more hierarchies across different portions of a memory comprising a plurality of dies; and
    storing and duplicating weight data across the plurality of dies wherein the weight data comprises a first and second subset of weights for use by the neural network, wherein:
    the first subset comprises unprunable weights and is stored in a first portion of the memory configured to utilize a first error correction code; and
    the second subset comprises prunable weights and is stored in a second portion of the memory configured to utilize a second error correction code that is different than the first error correction code.

11. The method of claim 10, wherein the data is organized into two or more hierarchies across the different portions of the memory.

12. The device of claim 11, wherein the weight data is further duplicated across the plurality of dies.

13. The device of claim 12, wherein the second error correction code is configured to be weaker than the first error correction code.

14. The method of claim 10, wherein the first and second subset of weights are stored in different types of memory.

15. The method of claim 14, wherein the selection of the different type of memory to store the first and second subset of weights is based on the utilization of the weight data.

16. The method of claim 15, wherein weight data that is accessed more often is stored within a memory type that has a lower latency compared to the other types of memory.

17. The method of claim 16, wherein the weight data stored within a lower latency memory type is configured with a weaker error correction code.

18. A non-transitory machine-readable medium having executable instructions to cause one or more processing devices to perform operations comprising:
 organizing data for a neural network across different portions of a memory comprising a plurality of memory structures; and
 storing weight data across the plurality of memory structures wherein the weight data comprises a first and second subset of weights for use by the neural network, wherein:
  the first subset comprises unprunable weights and is stored in a first portion of the memory configured to utilize a first error correction code, and
  the second subset comprises prunable weights and is stored in a second portion of the memory configured to utilize a second error correction code that is different than the first error correction code, that are pruned until a predetermined threshold associated with an accuracy of the neural network is exceeded.

* * * * *